W. F. McCARTY.
TENONING AND EQUALIZING MACHINE.
APPLICATION FILED AUG. 5, 1919.

1,337,143.

Patented Apr. 13, 1920.
7 SHEETS—SHEET 1.

WITNESSES

INVENTOR
William F. McCarty
BY
ATTORNEYS

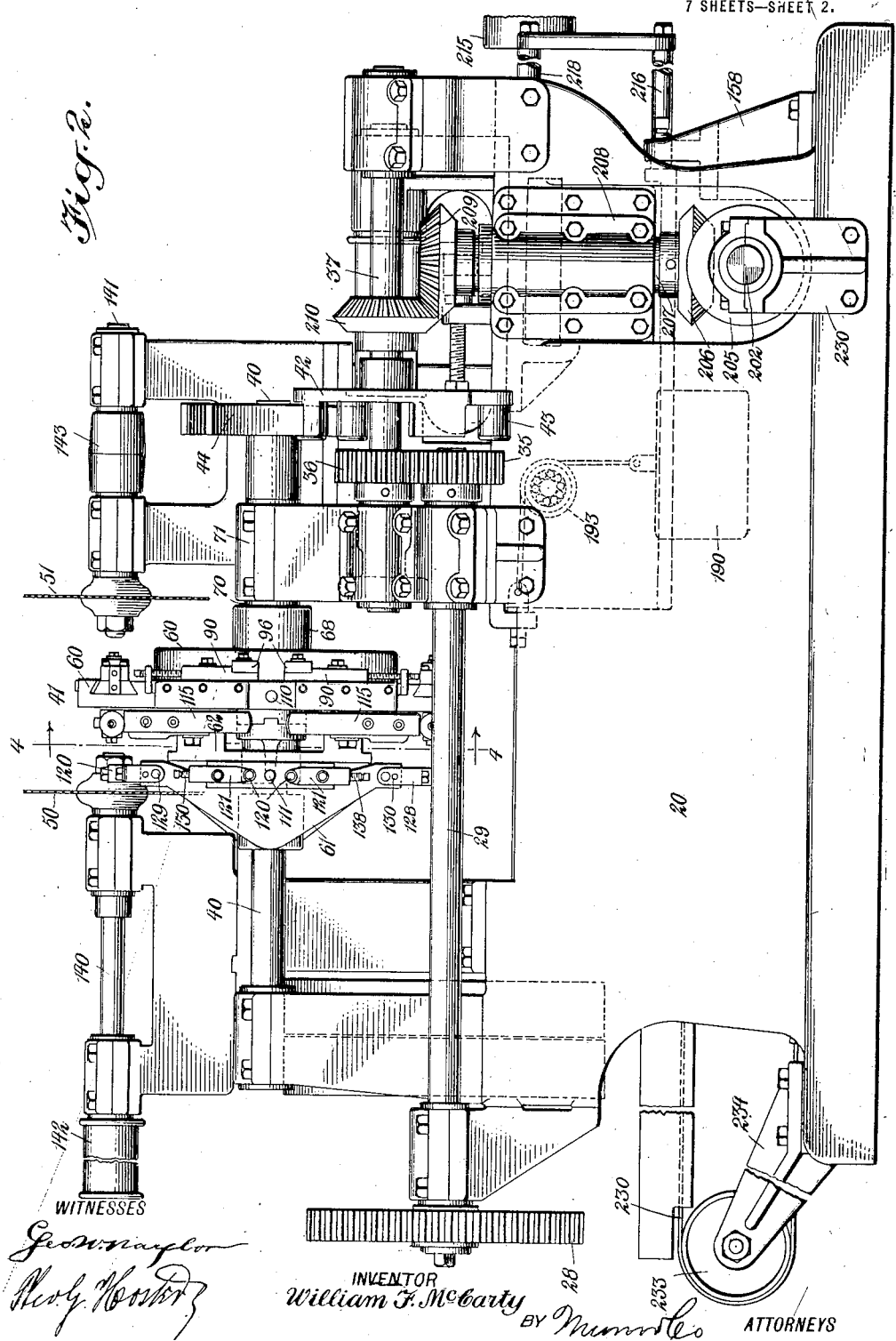

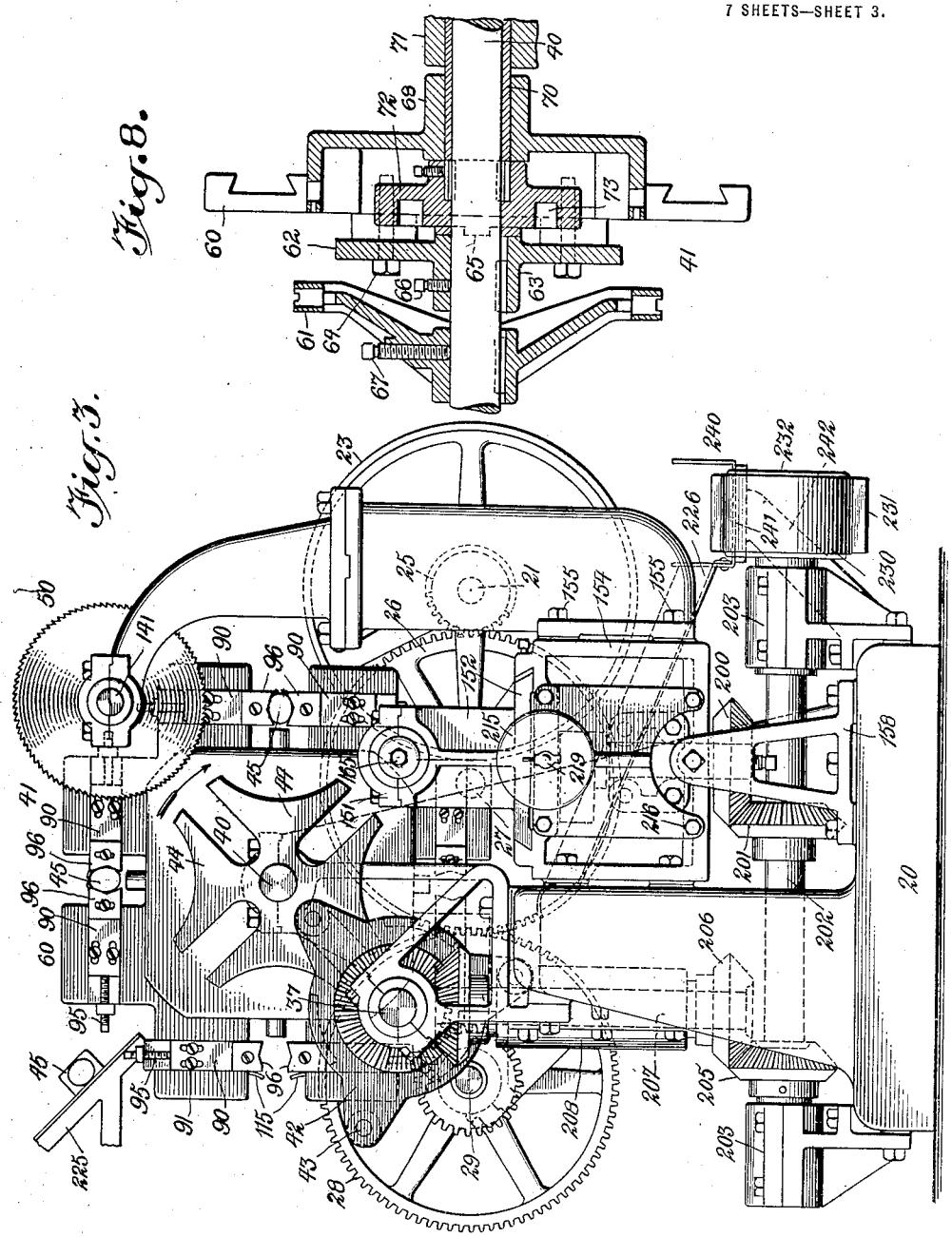

W. F. McCARTY.
TENONING AND EQUALIZING MACHINE.
APPLICATION FILED AUG. 5, 1919.
1,337,143.
Patented Apr. 13, 1920.
7 SHEETS—SHEET 4.
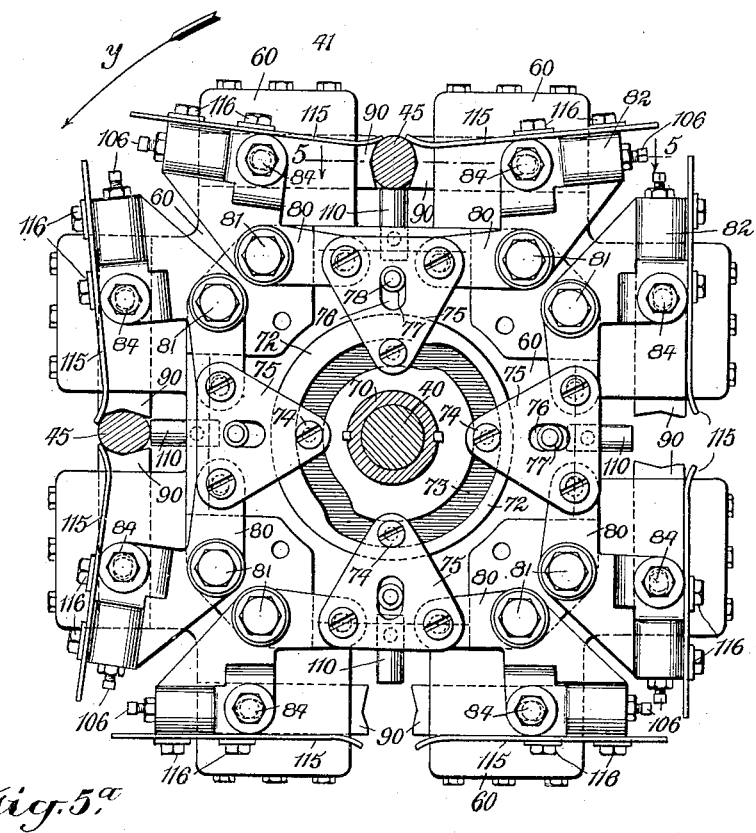
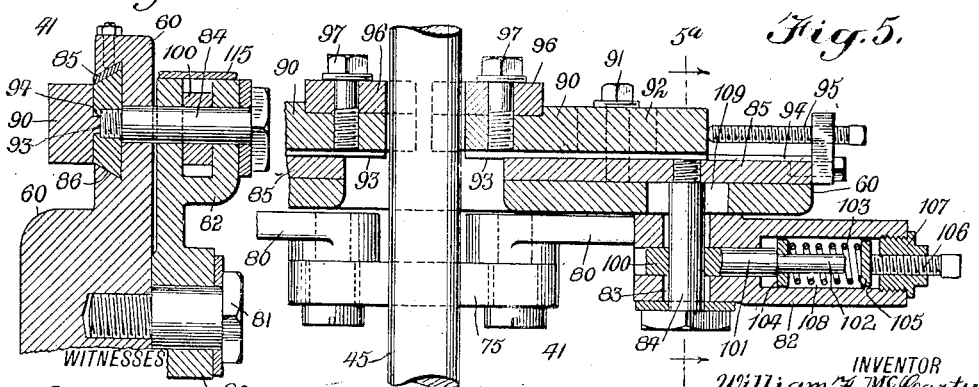

W. F. McCARTY.
TENONING AND EQUALIZING MACHINE.
APPLICATION FILED AUG. 5, 1919.

1,337,143.

Patented Apr. 13, 1920.

WITNESSES

INVENTOR
William F. McCarty
BY
ATTORNEYS

W. F. McCARTY.
TENONING AND EQUALIZING MACHINE.
APPLICATION FILED AUG. 5, 1919.
1,337,143.
Patented Apr. 13, 1920.
7 SHEETS—SHEET 6.
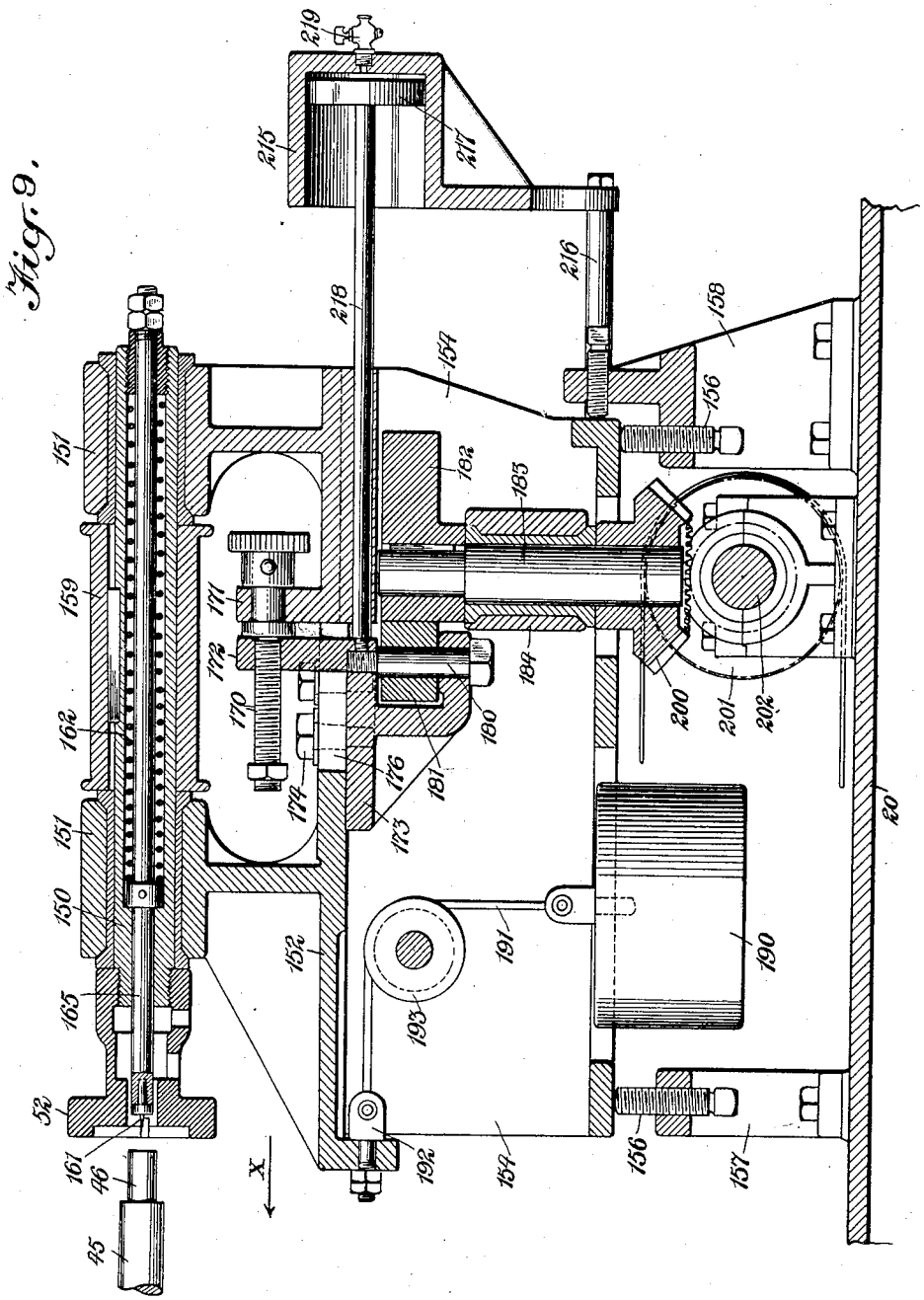
WITNESSES
INVENTOR
William F. McCarty
BY
ATTORNEYS

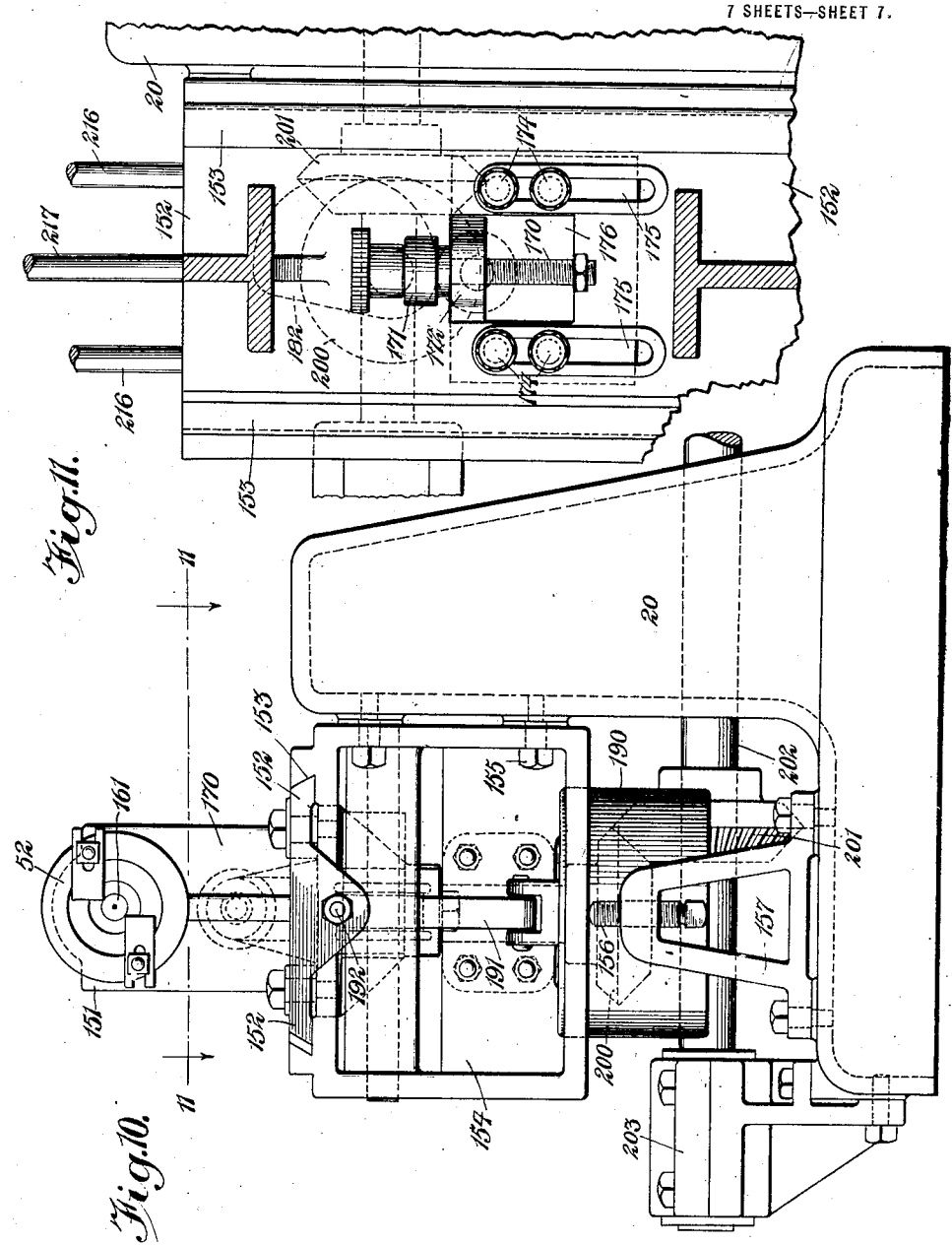

UNITED STATES PATENT OFFICE.

WILLIAM F. McCARTY, OF DEFIANCE, OHIO, ASSIGNOR TO DEFIANCE MACHINE WORKS, OF DEFIANCE, OHIO, A CORPORATION OF OHIO.

TENONING AND EQUALIZING MACHINE.

1,337,143.     Specification of Letters Patent.     Patented Apr. 13, 1920.

Application filed August 5, 1919. Serial No. 315,509.

*To all whom it may concern:*

Be it known that I, WILLIAM F. MCCARTY, a citizen of the United States, and a resident of Defiance, in the county of Defiance and State of Ohio, have invented a new and Improved Tenoning and Equalizing Machine, of which the following is a full, clear, and exact description.

The invention relates to woodworking machines, and its object is to provide a new and improved tenoning and equalizing machine more especially designed for accurately tenoning and equalizing sticks of wood or wooden spokes for the wheels of automobiles and other vehicles. Another object is to cut off both ends of a stick or spoke simultaneously with a view to make the sticks or spokes of the same length. Another object is to provide one end of a stick or a spoke after it is equalized with a tenon for engagement with a socket in a felly of a vehicle or other wheel or other article on which the stick is used. Another object is to dispense with highly skilled labor in running the machine. Another object is to permit of running the machine at a high speed with a view of equalizing and tenoning a large number of sticks or spokes in a comparatively short time.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 2 is a front elevation of the same;

Fig. 3 is an elevation of the right-hand end of the same;

Fig. 4 is an enlarged cross section of a portion of the tenoning and equalizing machine, the section being on the line 4—4 of Fig. 2, and showing more particularly the work holder for holding the sticks or spokes to be equalized and provided with tenons;

Fig. 5 is an enlarged sectional plan view of a portion of the work holder on the line 5—5 of Fig. 4;

Figure 1:
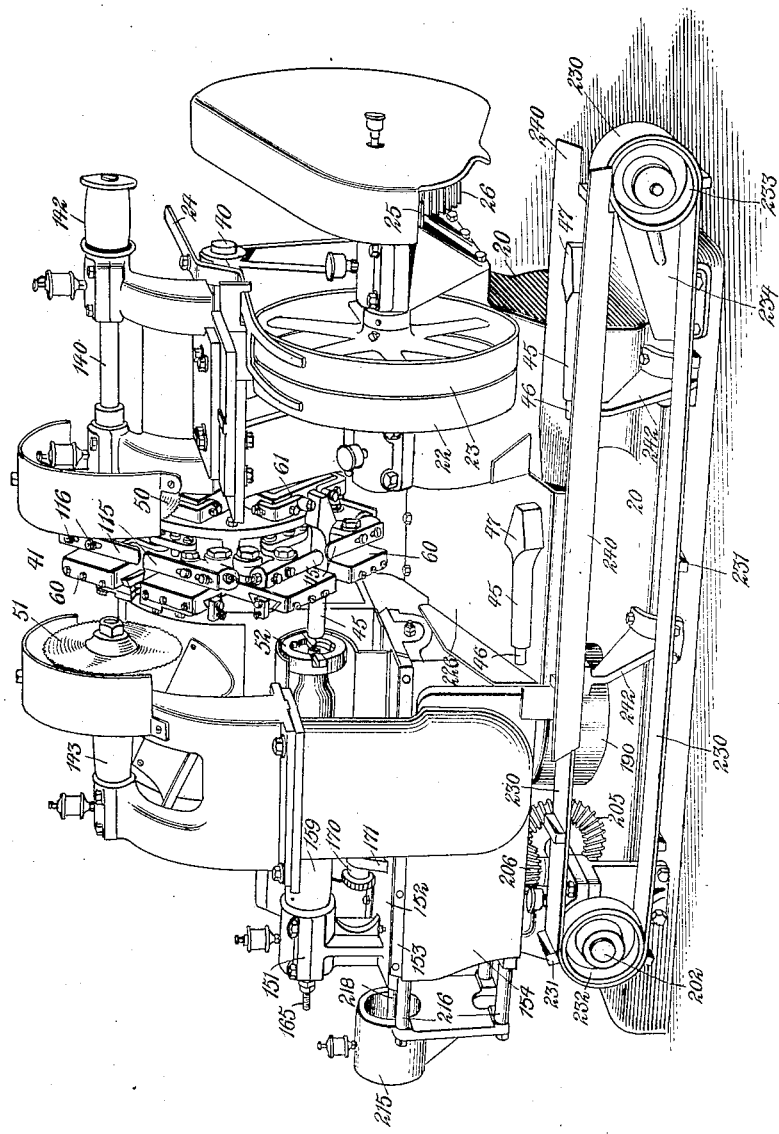
Figure 1 is a rear perspective view of the improved tenoning and equalizing machine.
Figure 7:
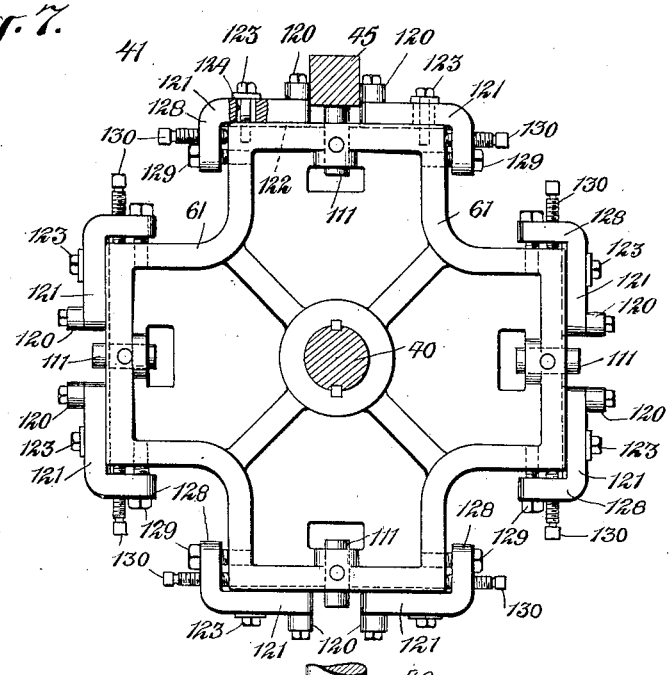
Figure 6:
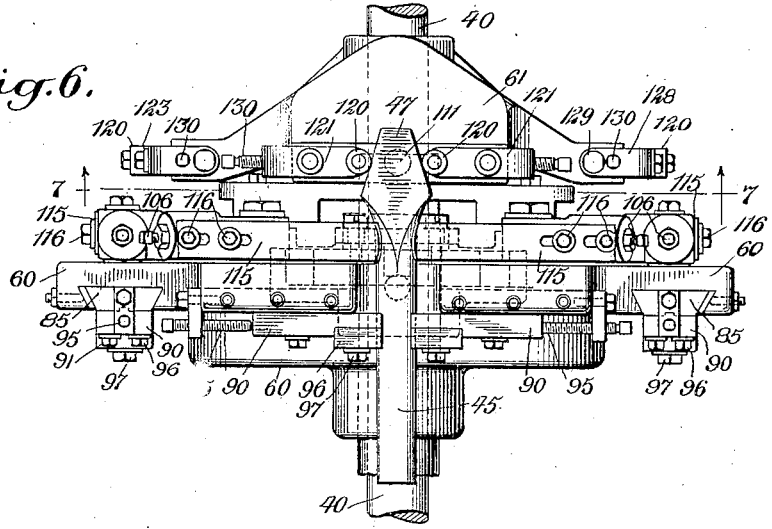

Fig. 5$^a$ is a sectional side elevation of the same on the line 5$^a$—5$^a$ of Fig. 5;

Fig. 6 is a plan view of the work holder with a spoke in position thereon;

Fig. 7 is a sectional view of the work holder on line 7—7 of Fig. 6;

Fig. 8 is a sectional side elevation of the body of the work holder;

Fig. 9 is an enlarged longitudinal central section of the tenon-forming device;

Fig. 10 is an end elevation of the same; and

Fig. 11 is a sectional plan view of the same on the line 11—11 of Fig. 10.

The tenoning and equalizing machine is mounted on a suitably constructed main frame 20 on which is journaled a main shaft 21 provided with fast and loose pulleys 22 and 23 connected by a belt (not shown) with other machinery for driving the main shaft 21, the said belt being controlled by a suitable shipping lever 24 pivoted on the main frame 20 and controlled by the operator in charge of the machine. On the shaft 21 is secured a pinion 25 in mesh with an intermediate gear wheel 26 mounted to turn on a stud 27 arranged on the left-hand end of the main frame, and the intermediate gear wheel 26 is in mesh with a gear wheel 28 secured on a countershaft 29 journaled in suitable bearings arranged on the front of the machine, as plainly illustrated in Fig. 2. On the shaft 29 is secured a small gear wheel 35 in mesh with a similar gear wheel 36 secured on a shaft 37 journaled on the main frame 20.

The shaft 37 imparts an intermittent motion to a shaft 40 on which is secured a work holder 41, and for this purpose use is made of a Geneva movement comprising a three-armed spider 42 secured on the shaft 37 and provided with friction rollers 43, one on each arm, and adapted to engage a star wheel 44 secured on the shaft 40. The work holder 41 is provided with four holding devices, each for holding a stick, spoke or other piece of work 45 to be carried past two circular saws 50 and 51 disposed on opposite sides of the work holder for cutting off both ends of the work simultaneously, thus making all the articles of the same length. After the work is equalized, it is carried by the work holder 41 to a revoluble cutter head 52 having bodily movement toward and from the work 45 to form a tenon 46 at one end thereof at the time the work holder 41 is at rest.

The work holder 41 is constructed as follows, special reference being had to Figs. 2, 4, 5, 6 and 7: The holding devices for the work 45 are alike in construction so that it suffices to describe but one in detail, it being understood, however, that the work holding devices are grouped around the work holder and spaced equal distances apart so that the work holding devices occupy similar positions on intermittently rotating the work holder 41. The body of the work holder is made in three parts 60, 61, and 62 (see Fig. 8). The parts 60 and 62 are fastened together by bolts 64, and the collar 63 of the part 62 is secured by means of key 65 to the shaft 40 and prevented from sidewise movement by a set screw 66. The part 61 is keyed or otherwise fastened to the shaft 40 and held against sidewise movement by a set screw 67. By the arrangement described the parts 60, 61, 62 and 63 form a unitary structure rotating with the shaft 40. The body part 60 is provided with a hub 68 mounted to rotate loosely on a sleeve 70 fixed in a bearing 71, and on the stationary sleeve 70 is keyed or otherwise secured a cam 72 provided in one face with a cam groove 73, as plainly shown in Figs. 4 and 8. It is understood that by making the body of the work holder 41 in parts or sections as described the several parts and the cam 72 can be readily assembled. The cam groove 73 is engaged by four friction rollers 74 each forming part of a corresponding holding device, and each roller 74 is journaled on a plate or link 75 provided with a radially disposed slot 76 through which extends a guide roller 77 mounted on a stud 78 attached to the inner face of the body part 60. Each plate or link 75 is pivotally connected with a pair of bell crank levers 80, each fulcrumed at 81 on the inner face of the body part 60. Each bell crank lever 80 is provided at its outer end with a bearing 82 having an opening 83 through which extends loosely a stud 84 screwed in or otherwise attached to a slide 85 preferably in the form of a dovetail (see Fig. 5ª) slidingly engaging a correspondingly shaped groove 86 formed in the body member 60. On the slide 85 is adjustably secured a jaw 90 by the use of a bolt 91 screwing in the slide 85 and extending through an elongated slot 92 formed in the jaw 90. The jaw 90 is provided with a tongue 93 fitting a groove 94 formed in the face of the slide 85 to prevent accidental displacement of the jaw 90 on its slide 85. A set screw 95 screws on the slide 85 and engages the outer end of the jaw 90 to assist in holding the latter against displacement. By the arrangement described, the jaw 90 can be readily adjusted on its slide 85 for gripping work 45 of different diameters. The inner end of the jaw 90 is provided with an auxiliary jaw member 96 fastened in place by a bolt 97 thus providing a large gripping surface for securely gripping the work 45. It will be noticed that each holding device is provided with two jaws 90 adapted to engage the work 45 at opposite sides thereof to securely grip the work, the faces of the jaws being preferably V-shaped, as indicated in Fig. 4, to provide a firm hold of the jaws on the work 45.

Each slide 85 of the work holder is yieldingly actuated from the corresponding bell crank lever 80, and for this purpose the stud 84 extends slidably through the opening 83 and is engaged by an eye 100 formed in a rod 101 mounted to slide in the bearing 82 at a right angle to the stud 84, as plainly shown in Fig. 5. The rod 101 is provided with a reduced outer portion 102 around which is coiled a spring 103 pressing against a collar 104 held on the reduced end 102 of the rod 101. The outer end of the spring 103 abuts against a washer 105 engaged by a set screw 106 screwing in a cap 107 screwed in the outer end of the bearing 82 to close the opening 108 formed in the bearing 82 and containing the spring 103. By the use of the set screw 106 the tension of the spring 103 can be regulated, it being understood that by the arrangement described, the stud 84 is yieldingly mounted on the bell crank lever 80 but moves with the latter when actuated by the plate 75 controlled by the cam 72. The stud 84 extends loosely through a slot 109 formed in the body part 60 to connect the bell crank lever located on one face of the body part 60 with the slide 85 arranged on the other face of the said body part.

Each piece of work 45 is adapted to rest on two pins 110 and 111, of which the pin 110 is attached to the body part 60 while the pin 111 is attached to the body part 61. In order to hold each piece of work down on the pins 110 and 111 use is made of pairs of springs 115 fastened by bolts 116 or other fastening means to the upper ends of the corresponding pair of bell crank levers 80 of a work holder. Thus the springs 115 swing with the bell crank levers and engage the top portion of the piece of work 45 at the time the pair of jaws 90 engages opposite sides of the said piece of work. In order to correctly position or gage the work 45 in the corresponding work holder, use is made of two friction rollers 120 adapted to be engaged by the opposite beveled sides of the head 47 of the work, as plainly indicated in Fig. 6, it being understood that the work in this case is a spoke for an automobile or other vehicle wheel. Each friction roller 120 is mounted on a bar 121 adjustably secured on the body part 61, as plainly indicated in Figs. 6 and 7. For the purpose mentioned each bar 121 is connected at the under side by a tongue and groove connection 122 with the body part 61 and a bolt 123 serves to hold the bar in place on the body part by extending through a slot 124 formed in the bar 121 and screwing in the body part 61. Each bar 121 is provided at its outer end with an angular lug 128 engaged by a bolt 129 screwing in the corresponding side of the body part 61, and in the lug 128 screws a set screw 130 to permit of conveniently adjusting the bar 121 on the body part 60 on loosening the bolts 123 and 129. It will be noticed that by the arrangement described, the bars 121 of a pair of bars can be readily adjusted toward or from each other to move the corresponding friction rollers 120 nearer together or farther apart according to the form of the head 47 of the spoke 45 positioned at the time on the work holder. It will also be noticed that the friction rollers 120 form an abutment or gage for the head 47 to cause the saws 50, 51 to accurately cut off the ends of the spoke. It is understood that by the arrangement described, the head 47 of the spoke 45 can be projected more or less beyond the friction rollers 120 to accurately position the spoke prior to cutting off the ends by the saws 50 and 51.

The circular saws 50 and 51 are mounted on spindles 140 and 141 journaled in suitable bearings arranged on the main frame 20, it being understood that the axes of the spindles coincide to insure simultaneous cutting off of the ends of the work 45. The spindles 140 and 141 are provided with pulleys 142 and 143 connected by belts (not shown) with other machinery for rotating the saws 50 and 51 at a high rate of speed and independent of the main shaft 21.

The cutter head 52 for providing one end of the work 45 with a tenon 46 is of usual construction and is secured on a spindle 150 journaled in suitable bearings 151, arranged on a carriage or spindle carrier 152 (see Figs. 9, 10 and 11) mounted to slide in a suitable guideway 153 formed on the top of a box-like support 154 fastened by bolts 155 to the main frame 20. The bottom of the box-like structure 154 rests on set screws 156 screwing in brackets 157, 158 bolted to the main frame 20. On the spindle 150 intermediate the bearings 151 is secured a pulley 159 connected by a belt with other machinery for imparting a rotary motion at a high speed to the spindle 150 and consequently to the cutter head 52. The pulley 159 is of considerable length to allow the carriage 152 to reciprocate toward and from the work with the belt traveling lengthwise on the said pulley 159. The cutter head 52 and the spindle 150 are made hollow to accommodate a center rod 165 provided at its inner end with a center 161 adapted to engage the end of the work 45 centrally with a view to center the work while the cutter head 52 forms a tenon 46 on this end of the work. The center rod 165 is mounted to slide in the spindle and is pressed on by a spring 162 to allow the center rod 165 to move outwardly after the center 161 has engaged the end of the work 45, and the carriage 152 and the cutter head 52 are advancing farther on the corresponding end of the work to provide the latter with a tenon 46 of a desired length.

In order to impart a reciprocating movement to the carriage 152 with a view to feed the cutter head 52 to the work for the cutter head to form a tenon 46 and to return the carriage to normal position with the cutter head spaced from the end of the work as shown in Fig. 9, the following arrangement is made: A screw rod 170 is mounted to turn in a lug 171 forming part of the carriage 152, and the said screw rod 170 screws in a lug 172 forming part of a bracket 173 adjustably fastened by bolts 174 to the carriage 152. The bolts 174 extend through longitudinal slots 175 formed in the carriage 152, and when the bolts 174 are loosened then the operator on turning the screw rod 170 can readily adjust the bracket 173 on the carriage 152. After the desired adjustment is made the bolts 174 are screwed up to fasten the bracket 173 in position on the carriage 152. The lug 172 extends through a cut-out portion 176 formed in the carriage, as plainly indicated in Figs. 9 and 11. On the bracket 173 is secured a vertically disposed stud 180 on which is mounted to turn a friction roller 181 in contact with the peripheral face of a cam 182 secured on the upper end of a vertically disposed shaft 183 journaled in a suitable bearing 184 arranged on the support 154. When the shaft 183 is rotated then the cam 182 engaging the friction roller 181 imparts a sliding movement to the carriage 152 in the direction of the arrow $x$, shown in Fig. 9, with a view to move the cutter head 52 in engagement with the corresponding end of the work 45. The return movement of the carriage 152 is caused by the action of a weight 190 secured at one end on a cable or other flexible connection 191 attached to a bolt 192 secured to the left-hand end of the carriage 152. The flexible connection 191 passes over a guide pulley 193 journaled on the support 154. It is understood that on the operator turning the screw rod 170 after the bolts 174 have been loosened, the bracket 173 is adjusted relative to the carriage 152 thus moving the carriage 152 and with it the cutter head 52 nearer to or farther from the work 45 according to the direction in which the screw rod 170 is turned. By the arrangement described, a shorter or longer tenon 46 can be turned on the work 45 by the cutter head 52 without changing the throw of the cam 182.

The shaft 183 is driven from and rotates in unison with the shaft 37 carrying the three-armed spider 42 of the Geneva movement employed for imparting an intermittent rotary motion to the shaft 40 carrying the work holder 41. For the purpose mentioned the lower end of the shaft 183 is provided with a bevel gear wheel 200 in mesh with a bevel gear wheel 201 secured on a transverse shaft 202 journaled in suitable bearings 203 arranged on the main frame 20 (see Figs. 1, 2, 3, 9 and 10). On the shaft 202 is secured a bevel gear wheel 205 in mesh with a bevel gear wheel 206 secured on the lower end of a vertically disposed shaft 207 journaled in a suitable bearing 208 attached to the main frame 20, as shown in Figs. 2 and 3. On the upper end of the shaft 207 is secured a bevel gear wheel 209 in mesh with a bevel gear wheel 210 secured on the shaft 37 so that when the latter is rotated a continuous rotary motion is transmitted by the gearing described to the shaft 183 to rotate the cam 182. The cam 182 by acting on the friction roller 181 moves the carriage 152 and the cutter head 52 in the direction of the arrow $x$, and return movement of the carriage and cutter head is had by the weight 190. By reference to Fig. 11 it will be noticed that the cam 182 is eccentric through the major portion to impart a uniform sliding movement to the carriage 152 in the direction of the arrow $x$, and the remaining portion is very abrupt to insure a quick return movement of the carriage by the action of the weight 190. Thus during the formation of the tenon 46 the cutter head 52 is bodily fed at a uniform rate of speed to the corresponding end of the work 45. As soon as the tenon 46 has been completed, a quick return movement is given to the cutter head 52 to move the latter out of engagement with the tenon 46 and away from the work. In order to relieve the carriage 152 of undue shock, use is made of a dash pot 215 attached by supporting rods 216 to the outer end of the support 154 (see Fig. 9). The dash pot 215 contains a piston 217 connected by a piston rod 218 with the bracket 173 fastened to the carriage 152. The dash pot 215 is provided with a suitable valve 219 to control the admission and exhaust of the air passing into the dash pot 215 in order to prevent undue shock to the carriage 152 during the return movement of the latter.

The work 45 is fed to the work holder 41 over a guideway 225 arranged on the upper front portion of the machine, as indicated in Fig. 3. The guideway 225 is in alinement with a pair of open jaws 90 at the time the work holder is in a position of rest. On the next quarter revolution of the work holder the work is clamped in place by the jaws and fed past the saws 50 and 51 for the latter to cut off the ends of the work and during the next quarter revolution the equalized piece of work is moved in alinement with the cutter head 52, which during this period of rest forms the tenon 46 on the work, and during the next quarter revolution the jaws 90 open and allow the work to drop on to a chute 226 mounted on the main frame 20 and extending downwardly and rearwardly (see Figs. 1 and 3). The lower end of the chute 226 discharges the work onto a conveyer, preferably in the form of an endless slat belt 230, provided with slats 231 and passing around pulleys 232 and 233, of which the pulley 232 is secured on the transverse shaft 202 whereby a traveling movement is given to the belt 230 when the machine is running. The pulley 233 is journaled in a suitable bracket 234 attached to the main frame 20 (see Fig. 1). A suitable guard 240 is arranged in the front and rear of the upper run of the endless belt 230 to prevent the work from accidentally dropping off the belt 230. The guard 240 is provided with a bottom plate 241 preferably supported by brackets 242 attached to the main frame 20. The bottom plate 241 extends under the upper run of the belt 230 and the rear member of the guard 240 connects with the lower end of the chute 226 to aid in supporting the latter. By the arrangement described, the work dropping on to the chute 226 is delivered by the latter on to the belt 230 which carries the work to one end of the machine, at which point it may be discharged on to another conveyer for carrying the work to another machine for further treatment.

The operation is as follows:

When the machine is running, the operator slides the spoke 45 down the guideway 225 into position on the work holder at rest at the time, that is, the spoke is placed on to the supporting pins 110 and 111, and its head 47 is pushed between the corresponding pair of friction rollers 120 in position opposite the guideway 225. The jaws 90 adjacent the guideway 225 are now in open or retracted position but close shortly after the work holder 41 has started to rotate in the direction of the arrow $y$ shown in Fig. 4. It is understood that at this time the friction roller 74 of the corresponding link 75 passes from the outer portion of the cam groove 73 to the inner portion thereby moving the links 75 radially inward. This action of the link 75 causes the corresponding bell crank levers 80 to swing toward each other whereby the jaws 90 are moved likewise toward each other and clampingly engage opposite sides of the spoke 45. The movement of the bell crank levers 80 as described causes the springs 115 to bear down on the spoke whereby the latter is securely held in place on the resting pins 110 and 111 between the friction rollers 120, the jaws 90 and the springs 115. The spoke thus held is next carried past the saws 50 and 51 to cut off the ends of the spoke. After a period of rest the spoke is next carried in alinement with the cutter head 52 which now advances and forms the tenon 46 at the end of the spoke opposite the head 47, it being understood that the friction rollers 120 now form a thrust bearing for the spoke to firmly hold the latter against movement in the direction of its length while the tenon 46 is formed on the spoke by the cutter head 52. After the cutter head 52 has formed the tenon and returned to its normal position shown in Fig. 9, the work holder is turned and the jaws 90 and springs 115 are now opened by the corresponding friction roller 74 passing from the inner end of the groove 73 to the outer portion thereof, thus releasing the spoke and allowing the latter to drop down on the chute 226. The spoke now slides down the chute 226 on to the endless belt 230, which latter carries the spoke to one end of the machine. It is understood that whenever a pair of open jaws are opposite the guideway 225, the operator places a spoke in position thereon, as previously explained. Thus for each revolution of the work holder 41 four spokes are placed in position thereon.

By the construction described, a large number of the spokes can be equalized and provided with tenons in a comparatively short time, and the spokes are all of uniform length and provided with tenons of the same diameter and length. It will also be noticed that the operator in charge is not required to give any attention to the machine but merely has to place the spokes in position one after the other, as above explained.

Although the work holder shown and described is provided with four work holding devices, and the star wheel 44 of the Geneva movement is provided with four slots it is evident that I do not limit myself to this particular construction as the number of work holding devices and slots in the star wheel may be increased or diminished without deviating from my invention. It is also evident that other means besides the Geneva movement may be employed for intermittently rotating the work holder.

Having thus described my invention I claim as new and desire to secure by Letters Patent:—

1. In a machine of the type described, a work holder having a plurality of peripheral holding devices spaced equal distances apart and each adapted to hold a stick approximately parallel with the axis of the work holder, each holding device having a pair of gripping jaws adapted to grip opposite sides of the stick a distance from its end, means for operating said jaws, a rest for the stick to rest on, springs carried by the means operating the jaws and bearing on the stick to hold the latter down on the rest, and a combined gage and abutment for one end of the stick to abut against to hold the stick against lengthwise movement and to gage the stick, means for intermittently rotating the said work holder, a revoluble cutter head having its axis parallel to the axis of the work holder and coinciding with the axis of a stick at rest at a time, and means moving the said cutter head bodily into engagement with the other end of the said stick to form a tenon on this end while the work holder is at rest.

2. In a machine of the type described, a work holder having a plurality of peripheral holding devices spaced equal distances apart and each adapted to hold a stick approximately parallel with the axis of the work holder, each holding device having a pair of suitable gripping jaws adapted to grip opposite sides of the stick a distance from its end, a rest for the stick to rest on, springs bearing on the stick to hold the latter down on the rest and a combined gage and abutment between which one end of the stick extends to hold the stick against lengthwise movement and to gage the stick, means for intermittently rotating the said work holder, a fixed cam having its axis coinciding with the axis of the work holder, actuating means mounted on the work holder and connected with the said gripping jaws to actuate the latter, a revoluble cutter head having its axis parallel to the axis of the work holder and coinciding with the axis of a stick at rest at a time, and means moving the said cutter head bodily into engagement with the other end of the said stick to form a tenon on this end while the work holder is at rest.

3. In a machine of the type described, a work holder frame, means intermittently rotating the same, a fixed cam, a pair of bell crank levers connected with and actuated from the said cam, a pair of gripping jaws slidable on the said frame and yieldingly connected with the said bell crank levers and adapted to grip opposite sides of the work, rests mounted on the said frame and on which the work is adapted to rest, springs mounted on the said bell crank levers and adapted to bear on the work to hold the latter against the said rests, a combined abutment and gage mounted on the said frame and engaged by one end of the work, a revoluble cutter head having its axis coinciding with the axis of the work at the time the latter is in a position of rest, and means bodily moving the said cutter head into engagement with the other end of the work to form a tenon thereon.

4. In a machine of the type described, a work holder frame having a shaft, means intermittently rotating the said shaft, a fixed cam having its axis coinciding with the said shaft, a link slidably mounted on the said frame and engaging the said cam, a pair of bell crank levers connected with the said link, studs on which the said bell crank levers are loosely fulcrumed, a pair of slides mounted to slide on the said frame and in which the said studs are secured, jaws attached to the said slides and adapted to grip a stick on opposite sides thereof to carry the stick intermittently around, and a revoluble cutter head adapted to engage one end of the stick to form a tenon thereon while the work holder frame is at rest.

5. In a machine of the type described, a work holder frame having a shaft, means intermittently rotating the said shaft, a fixed cam having its axis coinciding with the said shaft, a link slidably mounted on the said frame and engaging the said cam, a pair of bell crank levers connected with the said link, studs on which the said bell crank levers are loosely fulcrumed, a pair of slides mounted to slide on the said frame and in which the said studs are secured, jaws attached to the said slides and adapted to grip a stick on opposite sides thereof to carry the stick intermittently around, a spring-pressed rod mounted to slide on each bell crank lever and having an eye engaging the corresponding stud to yieldingly hold the jaws in engagement with the stick, and a revoluble cutter head adapted to engage one end of the stick to form a tenon while the work holder frame is at rest.

6. In a machine of the type described, an intermittently revolving work holder provided with means for holding and releasing a stick, a cutter head having its axis coinciding with the stick at the time the work holder is in a position of rest, a driven spindle carrying the said cutter head, a center centrally and yieldingly mounted in the spindle and extending in the said cutter head to engage the end of the stick to be provided with a tenon by the said cutter head, a slidable spindle carrier in which the said spindle is journaled, and means imparting a reciprocating motion to the said spindle carrier to move the said cutter head and the said center in engagement with the end of the stick to form a tenon thereon.

7. In a machine of the type described, an intermittently revolving work holder provided with means for holding and releasing a stick, a cutter head having its axis coinciding with the stick at the time the work holder is in a position of rest, a driven spindle carrying the said cutter head, a center centrally and yieldingly mounted in the spindle and extending in the said cutter head to engage the end of the stick to be provided with a tenon by the said cutter head, a slidable spindle carrier in which the said spindle is journaled, a bracket adjustably connected with the said spindle carrier, a friction roller journaled in the said bracket, and a revoluble cam engaged by the said friction roller for imparting a reciprocating motion to the said spindle carrier.

8. In a machine of the type described, an intermittently revolving work holder provided with means for holding and releasing a stick, a cutter head having its axis coinciding with the stick at the time the work holder is in a position of rest, a driven spindle carrying the said cutter head, a center centrally and yieldingly mounted in the spindle and extending in the said cutter head to engage the end of the stick to be provided with a tenon by the said cutter head, a slidable spindle carrier in which the said spindle is journaled, a bracket adjustably connected with the said spindle carrier, a friction roller journaled in the said bracket, a revoluble cam engaged by the said friction roller for imparting a reciprocating motion to the said spindle carrier, and means connected with the said spindle carrier to hold the said roller in engagement with the said cam.

9. In a machine of the type described, an intermittently revolving work holder provided with means for holding and releasing a stick, a cutter head having its axis coinciding with the stick at the time the work holder is in a position of rest, a driven spindle carrying the said cutter head, a center centrally and yieldingly mounted in the spindle and extending in the said cutter head to engage the end of the stick to be provided with a tenon by the said cutter head, a slidable spindle carrier in which the said spindle is journaled, a bracket adjustably connected with the said spindle carrier, a friction roller journaled in the said bracket, a revoluble cam engaged by the said friction roller for imparting a reciprocating motion to the said spindle carrier, and a dash pot connected with the said bracket.

10. In a machine of the type described, an intermittently revolving work holder provided with means for holding and releasing a stick, a cutter head having its axis coinciding with the stick at the time the work holder is in a position of rest, a driven spindle carrying the said cutter head, a center centrally and yieldingly mounted in the spindle and extending in the said cutter head to engage the end of the stick to be provided with a tenon by the said cutter head, a slidable spindle carrier in which the said spindle is journaled, a bracket adjustably connected with the said spindle carrier, a friction roller journaled in the said bracket, a revoluble cam engaged by the said friction roller for imparting a reciprocating motion to the said spindle carrier, a weight, a connecting means supporting the weight and connected with the said spindle carrier to hold the said roller against the said cam, and a dash pot connected with the said bracket to ease the return movement of the said spindle carrier.

11. In a machine of the type described, a cutter head for forming a tenon on one end of a spoke, and a work holder having clamping means and positioning and thrust bearing means for holding a spoke securely and accurately in position on the work holder while the said cutter head forms a tenon on one end thereof, said thrust bearing means comprising a pair of rollers between which one end of the stick extends.

12. In a machine of the type described, a cutter head for forming a tenon on one end of a spoke, a work holder having clamping means for holding a spoke in place on the work holder, a gage on the work holder engaged by the other end of the spoke to allow of positioning the spoke on the work holder and to form a thrust bearing for the spoke while the said cutter head forms a tenon on the other end of the spoke, said gage and thrust bearing comprising adjustable bars mounted in the holders and carrying rollers between which one end of the stick extends.

13. In a machine of the type described, a pair of equalizing saws for cutting off the ends of a spoke, a cutter head for forming a tenon on one end of a spoke after the latter is equalized, and an intermittently reciprocating work holder having clamping means for securely holding the spoke in place and having adjustable positioning and thrust bearing means adapted to be engaged by the head of the spoke to position the spoke relative to the saws and to form a thrust bearing for the spoke while the cutter head forms a tenon on the other end of the spoke.

14. In a machine of the type described, an intermittently revolving shaft, a work holder body rotating with the said shaft, a fixed cam through which extends the said shaft, pairs of slidable work holders mounted in spaced relation on the said work holder body, pairs of bell crank levers fulcrumed on the work holder body, means connecting the bell crank levers with the said work holders to slide them toward and from each other, and links slidable on the said work holder body and each connecting the said cam with a pair of bell crank levers to actuate the same.

15. In a machine of the type described, an intermittently revolving shaft, a work holder body rotating with the said shaft, a fixed cam through which extends the said shaft, pairs of work holders mounted in spaced relation on the said work holder body and each having a pair of jaws mounted to slide on the work holder body toward and from each other, pairs of bell crank levers fulcrumed on the said work holder body, yielding connections connecting a pair of bell crank levers with a pair of jaws, and links slidable on the said work holder body and connecting the said cam with a corresponding pair of bell crank levers.

16. In a machine of the class described, an intermittently revolving shaft, a work holder body rotating with the said shaft, a fixed cam having its axis coinciding with the axis of the said shaft, pairs of slides mounted to slide on the said work holder body, a pair of jaws adjustably mounted on a corresponding pair of slides and adapted to grip the work on opposite sides thereof, a pair of bell crank levers for each pair of slides and fulcrumed on the said work holder body, links mounted to slide radially on the work holder and connected with the said cam, each slide being connected with a corresponding pair of bell crank levers, studs held loosely on the bell crank levers and attached to the corresponding slides, and a spring rod slidably mounted on each bell crank lever and having an eye engaging the corresponding stud.

17. In a machine of the type described, an intermittently revolving work holder adapted to carry spokes, a revoluble cutter head adapted to form a tenon on one end of each spoke while the work holder is at rest, a vertically adjustable carriage in which the said cutter head is mounted to rotate, a cam mounted to turn and having a peripheral cam face, a friction roller in engagement with the peripheral face of the cam, means for adjustably mounting the roller on the carriage, means connected with the said carriage to hold the friction roller in contact with the said cam, a main shaft, continuous driving means connected with the said main shaft and the said cam to continuously rotate the latter, and intermittent driving means driven from the said main shaft and connected with the said work holder to intermittently rotate the same.

18. In a machine of the type described, a work holder, a pair of gripping jaws mounted on the work holder and adapted to grip opposite sides of a stick actuating means for the jaws, and springs carried by the actuating means for engaging the stick when the stick is gripped by the jaws.

19. In a machine of the type described, a work holder, a pair of sliding gripping jaws mounted on the holder and adapted to grip opposite sides of a stick, bell crank levers operatively connected with the said jaws, springs carried by the bell crank levers for engaging the stick when gripped by the jaws, and means for operating the bell crank levers.

20. In a machine of the type described, a work holder, slidable members, gripping jaws carried by said members, bell crank levers, a yielding connection between said bell crank lever and a slidable member, and means for operating the bell crank levers.

21. In a machine of the type described, a work holder, slidable members, gripping jaws carried by the slidable members, bell crank levers, a stud connecting each bell crank lever with a member, a sliding and spring pressed rod having an eye engaging the said stud, and means for operating the bell crank levers.

WILLIAM F. McCARTY.